United States Patent [19]

Schlipf

[11] Patent Number: 4,928,035
[45] Date of Patent: May 22, 1990

[54] GLASS VIEWING SCREEN FOR A COLOR-PICTURE-REPRODUCING DEVICE AND A METHOD OF MAKING THE SAME

[75] Inventor: Michael Schlipf, Schorndorf, Fed. Rep. of Germany

[73] Assignee: Nokia Graetz, Pforzheim, Fed. Rep. of Germany

[21] Appl. No.: 311,089

[22] Filed: Feb. 14, 1989

Related U.S. Application Data

[63] Continuation-in-part of Ser. No. 922,738, Oct. 24, 1986, abandoned.

[30] Foreign Application Priority Data

Oct. 26, 1985 [DE] Fed. Rep. of Germany ....... 3538167

[51] Int. Cl.$^5$ .............................................. H01J 29/10
[52] U.S. Cl. .................................... 313/466; 313/462; 313/470
[58] Field of Search ............... 313/461, 462, 466, 470, 313/471, 472; 430/25

[56] References Cited

U.S. PATENT DOCUMENTS

| | | | |
|---|---|---|---|
| 3,654,505 | 4/1972 | Davis et al. | 313/466 X |
| 3,888,686 | 6/1975 | Ellis | 501/76 X |
| 4,006,028 | 2/1977 | Nofziger | 501/76 X |
| 4,243,735 | 1/1981 | Kobale et al. | 430/25 |

FOREIGN PATENT DOCUMENTS

492567 9/1977 Australia .
2806436 8/1979 Fed. Rep. of Germany .

Primary Examiner—Donald J. Yusko
Assistant Examiner—Michael Horabik
Attorney, Agent, or Firm—Peter C. Van Der Sluys

[57] ABSTRACT

In a glass viewing screen for a color-picture-reproducing device, the phosphor areas deposited on the inside of the glass viewing screen are surrounded by a sealing-glass matrix. The matrix is made of a sealing glass that shrinks upon thermal crystallization so that the sealing glass may be deposited by screen printing.

7 Claims, 1 Drawing Sheet

GLASS VIEWING SCREEN FOR A COLOR-PICTURE-REPRODUCING DEVICE AND A METHOD OF MAKING THE SAME

CROSS REFERENCE TO RELATED APPLICATIONS

This application is a continuation-in-part of U.S. application Ser. No. 061/922,738 filed Oct. 24, 1986, now abandoned.

BACKGROUND OF THE INVENTION

Field of the Invention

The invention pertains to a color-picture-reproducing device, and to a method of producing same.

Description of the Prior Art

German Patent No. 28 06 436 and corresponding U.S. Pat. No. 4,243,735 disclose a method of producing the black edging around phosphor dots on the glass screen of a color picture tube. In that method, a slurry consisting of a bright sealing-glass powder, metal in oxidic form and a photoresist is sprayed on the glass screen. This slurry is then exposed through a mask and developed, the exposed parts are detached. In a subsequent annealing step at temperatures of between 350 degrees C. and 500 degrees C, the matrix thus formed is then changed into the desired black edging.

While the above method produced a satisfactory matrix, it was a costly and time-consuming process requiring first the disposition of material on the entire surface and then selective removal to form the matrix. Directly depositing the material in the shape of the desired matrix would be much more desirable. Screen printing of the matrix would have been an excellent solution to the problem; however, sufficiently fine wires for the printing screen were not available to provide a screen mesh fine enough to print matrix elements having a sufficiently narrow width.

SUMMARY OF THE INVENTION

It is an object of the present invention to provide a color-picture-reproducing device having a close-meshed matrix of sealing glass consisting of narrow elements, and a simple method of producing such a matrix.

The above object is achieved by uniquely using a sealing glass having a high proportion of fine-grained material to form the matrix which is printed on the glass viewing screen using screen printing techniques. When high proportions of fine-grained material are used in the sealing glass the printed elements of the matrix shrink upon crystallization rather than flowing.

BRIEF DESCRIPTION OF THE DRAWINGS

The invention will be better understood from a reading of the following detailed description in conjunction with the drawings in which.

DESCRIPTION OF THE PREFERRED EMBODIMENT

Figure 1:
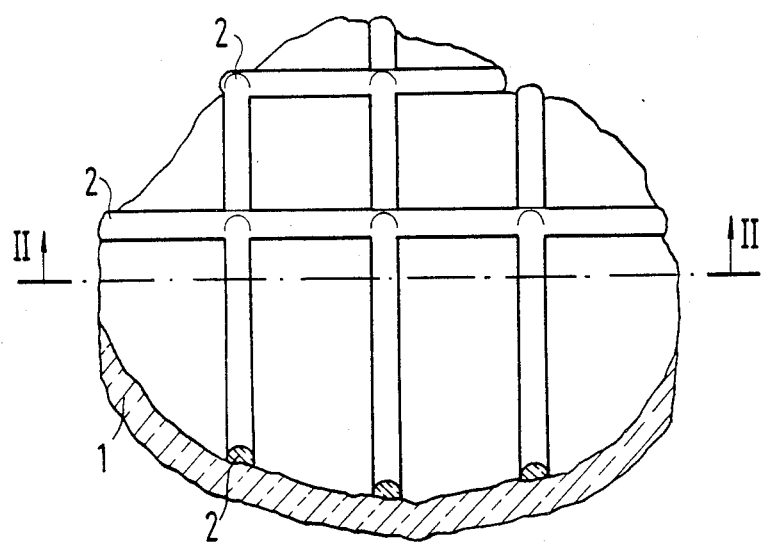
FIG. 1 is a perspective view of a portion of the glass viewing screen of the color-picture-reproducing device.
Figure 2:
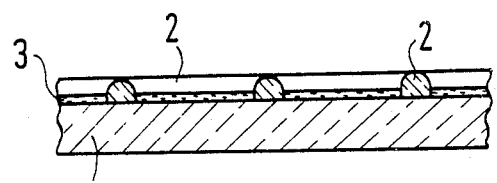
FIG. 2 is a section taken along line II-II of FIG. 1.

FIG. 1 shows a part of the flat glass screen 1 of the color-picture-reproducing device. A matrix 2 of sealing glass is deposited on the inside surface of the glass screen 1. The matrix may consist of parallel, intersecting or only parallel elements. In FIG. 1, a matrix of intersecting elements is shown above the line II—II, and a matrix of only parallel elements below that line. The width of the elements of the matrix 2 is about 60 um, and the elements are about 140 um apart. The phosphor material 3, shown in FIG. 2, is later deposited in the openings formed by the matrix. The preferred width of the elements of matrix 2 is about 60 um; however, widths down to 50 um would also be satisfactory.

In FIG. 2, which is a section along line II—II of FIG. 1, it can be seen that phosphor material 3 is present in the openings formed by the matrix 2. Square phosphor areas are formed by a matrix consisting of intersecting elements, and phosphor stripes in a matrix consisting of parallel elements.

The sealing glass of the matrix 2 is a material which shrinks during thermal crystallization. Sealing glasses are well known to those skilled in the art, and when used for their designated purposes, i.e., to seal a faceplate to a funnel in a picture tube, a shrinking characteristic is undesired. To promote shrinking the sealing glass must have a high proportion of fine-grained material so that the sealing glass will tend to shrink rather than flow. The shrinking effect depends on the relative surface of the crystallization nuclei in the sealing glass, so that the shrinking effect can be produced either by adding crystallization nuclei to the sealing glass or by breaking up the crystallization nuclei which are present in the sealing glass by producing a fine-grained material. The starting material for the sealing glass may be any crystallizing sealing glass powder; however, a preferred sealing-glass powder is the 7590 Special type of Corning Glass. The 7590 Special glass is ground in a mill so that preferably 90 percent of the particles of this sealing glass have a size smaller than 10 um. The particles may be of a size such that 80 to 100 percent of the particles are smaller than 10 um. A maximum limit for particle size that would produce the desired shrinking would be 85 percent less than 15 um. Thus, most commercially available sealing glasses must be milled to achieve the desired particle size.

The preferred Corning 7590 Special sealing glass is a lead oxide, zinc oxide, boron trioxide glass. The composition is 50-75 percent lead oxide, 10-25 percent silica, 10-25 percent zinc oxide, 7-15 percent boron oxide, 1-10 percent barium oxide and 1-10 percent zirconium oxide.

The color-picture-reproducing device is manufactured as follows:

The sealing-glass powder is first milled to achieve the desired particle size. The powder is then mixed with a binding agent (methacrylate) and a solvent (butyl diglycolic acetate) to give a sealing-glass paste. The latter is then deposited by screen printing in the form of the desired matrix 2 on the glass screen 1 which serves as the substrate. The glass screen 1, on which the sealing-glass paste has been printed, is then subjected to an annealing process during which the sealing glass crystallizes. Annealing takes place at about 440 degrees C. during 45 minutes, with the usual temperature gradients during heating and cooling. In the process, the sealing glass shrinks and the desired narrow elements of the matrix are formed.

Due to the shrinking of the sealing glass during crystallization, the glass paste can be screen printed as elements having a width greater then the desired width. For example, if a 60 um element is desired, the paste can be printed with a width of 70 um, since a shrinkage of about 10 um is experienced.

Hitherto, it was not possible to produce the required narrow elements of the matrix 2 on the glass screen 1 in sufficiently good quality because a minimum mesh size and a minimum thread diameter of the screen-printing stencil was not available. By using shrinking sealing glass, it is now possible to use screen-printing stencils having a larger line width. This results in a simpler method of production of the screen-printing stencils, improves the printability of the sealing-glass paste and gives the desired narrow elements of the matrix.

What is claimed is:

1. A glass viewing screen for a color-picture-reproducing device, comprising:
   a glass viewing screen;
   phosphor areas deposited on the inside surface of said screen; and
   a matrix of glass elements formed on said screen and surrounding said phosphor areas, said glass elements comprising a crystallizing sealing glass, applied to said screen as a paste by screen printing, said sealing glass paste having particles, 80 percent or more of which are smaller than 15 um, whereby the sealing glass has a characteristic such that it shrinks upon thermal crystallization.

2. A glass viewing screen as described in claim 1, wherein the sealing glass particles are of a size such that 80 percent or more are less than 10 um.

3. A glass viewing screen as described in claim 1, wherein the sealing glass particles are of a size such that 90 percent or more are less than 10 um.

4. A glass viewing screen as described in claim 1, wherein the matrix elements have widths between 50 and 60 um.

5. A glass viewing screen as described in claim 1, wherein the elements of said matrix include parallel lines.

6. A glass viewing screen as described in claim 5, wherein the elements of said matrix include intersecting sets of parallel lines.

7. A glass viewing screen as described in claim 1, wherein the sealing glass is a lead oxide sealing glass.

* * * * *